United States Patent
Simpson et al.

[11] Patent Number: 5,967,921
[45] Date of Patent: Oct. 19, 1999

[54] HYDRAULIC CHAIN TENSIONER WITH MOLDED PLASTIC BODY

[75] Inventors: Roger T. Simpson, Ithaca; Michael C. Duffield, Willseyville; Todd K. Preston, Horseheads, all of N.Y.

[73] Assignee: Borg-Warner Automotive, Inc., Sterling Heights, Mich.

[21] Appl. No.: 08/948,205

[22] Filed: Oct. 9, 1997

[51] Int. Cl.⁶ .............................. F16H 7/08; F01L 25/04
[52] U.S. Cl. .............................. 474/110; 474/111; 91/297
[58] Field of Search .......................... 474/101, 109–111, 474/140, 138, 135, 137, 117; 91/432, 297, 316; 92/130 R, 135, 248

[56] References Cited

U.S. PATENT DOCUMENTS

| | | | |
|---|---|---|---|
| 2,777,427 | 1/1957 | Nichols | 91/297 |
| 4,190,025 | 2/1980 | Wahl | 123/90.31 |
| 4,507,103 | 3/1985 | Mittermeier | 474/110 |
| 4,761,155 | 8/1988 | Kinoshita et al. | 474/101 X |
| 4,826,470 | 5/1989 | Breon et al. | 474/110 |
| 4,850,941 | 7/1989 | Sosson | 474/110 |
| 4,894,047 | 1/1990 | Breon et al. | 474/110 |
| 4,940,447 | 7/1990 | Kawashima et al. | 474/110 |
| 4,963,121 | 10/1990 | Himura et al. | 474/110 |
| 5,030,169 | 7/1991 | Kiso et al. | 474/110 |
| 5,037,357 | 8/1991 | Ojima | 474/111 |
| 5,193,498 | 3/1993 | Futami | 474/110 X |
| 5,277,664 | 1/1994 | Mott | 474/110 |
| 5,346,436 | 9/1994 | Hunter et al. | 474/110 |
| 5,482,262 | 1/1996 | Hayakawa et al. | 474/110 |
| 5,797,817 | 8/1998 | Senftleben | 474/138 X |

*Primary Examiner*—John A. Jeffery
*Assistant Examiner*—Marcus Charles
*Attorney, Agent, or Firm*—Sidley & Austin; Greg Dziegielewski

[57] ABSTRACT

A hydraulic tensioner is designed for low cost and ease of manufacturing. A housing has a bore and a sleeve member received within the bore. A piston is slidably received within the sleeve member, forming a high pressure fluid chamber with the sleeve member. The housing can be constructed of inexpensive materials such as aluminum or plastic. The piston and sleeve member are constructed of drawn metal. The housing may be formed by injection molding. The sleeve member and other components of the tensioner may be assembled within the tensioner by inserting them into the mold during the injection molding process.

10 Claims, 4 Drawing Sheets

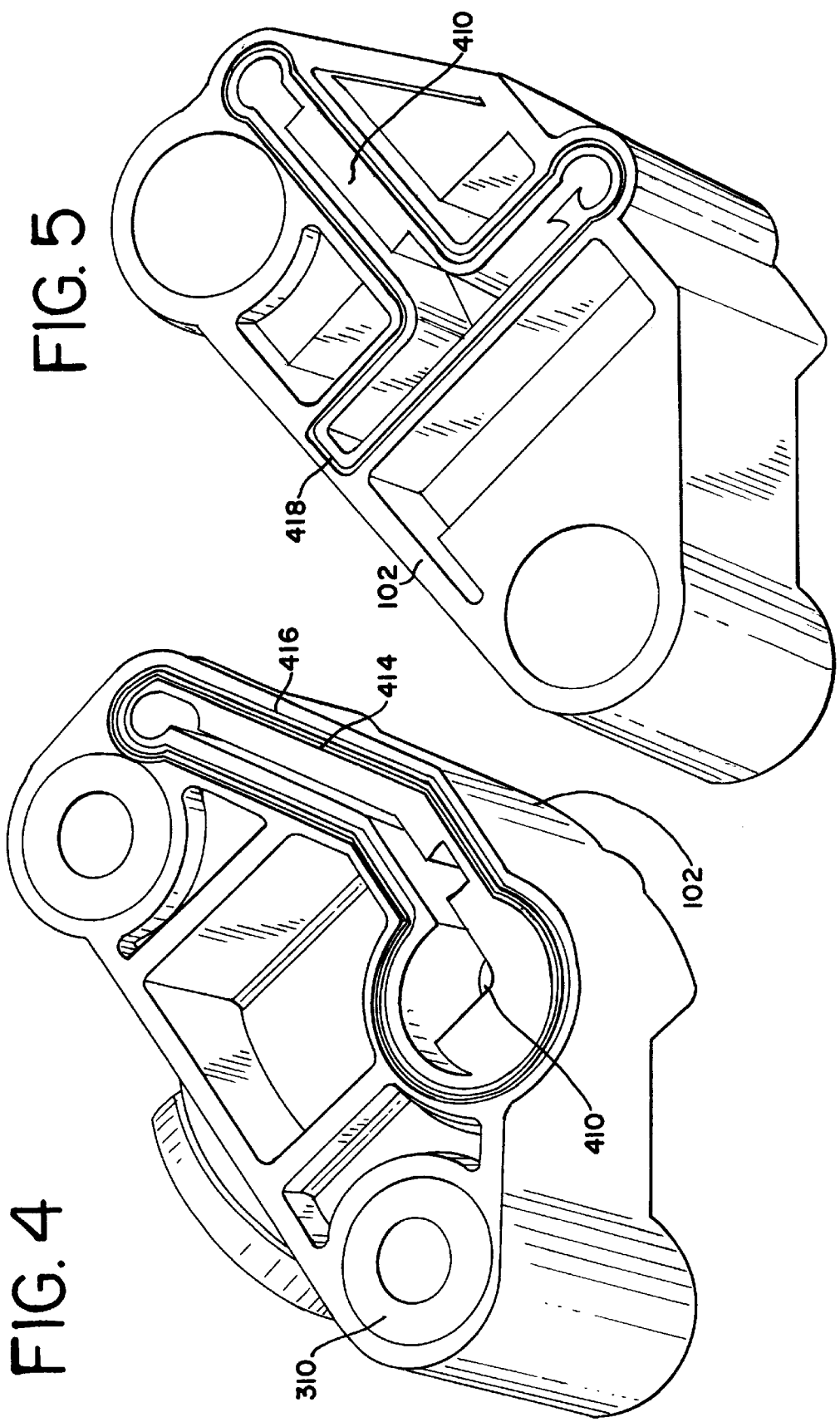

HYDRAULIC CHAIN TENSIONER WITH MOLDED PLASTIC BODY

Reference is made to application Ser. No. 08/760,267, filed Dec. 5, 1996, now abandoned entitled, "Hydraulic Tensioner With Plastic Body And Piston," the subject matter of which relates to the present invention and which is incorporated herein by reference.

Reference is also made to copending application Ser. No. 08/947,594, filed Oct. 9, 1997, entitled, "Hydraulic Chain Tensioner With Deep Drawn Cup," filed concurrently with this application, which is incorporated herein by reference.

BACKGROUND OF THE INVENTION

A tensioning device, such as a hydraulic tensioner, is used as a control device for a power transmission chain, or similar power transmission device, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain.

Prevention of such slippage is particularly important in the case of a chain driven camshaft in an internal combustion engine because jumping of teeth will throw off the camshaft timing, possibly causing damage or rendering the engine inoperative. However, in the harsh environment of an internal combustion engine, various factors can cause fluctuations in the chain tension.

For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Hydraulic tensioners are a common method of maintaining proper chain tension. In general, these mechanisms employ a lever arm that pushes against the chain on the slack side of the power transmission system. This lever arm must push toward the chain, tightening the chain, when the chain is slack, and must be very rigid when the chain tightens.

To accomplish this result, a hydraulic tensioner typically comprises a rod or cylinder as a piston, which is biased in the direction of the chain by a tensioner spring. The piston is housed within a cylindrical housing, having an interior space which is open at the end facing the chain and closed at the other end. The interior space of the housing contains a pressure chamber in connection with a reservoir or exterior source of hydraulic fluid. The pressure chamber is typically formed between the housing and the piston, and it expands or contracts when the piston moves within the housing.

Typically, valves are employed to regulate the flow of fluid into and out of pressure chamber. For instance, an inlet check valve typically includes a ball-check valve that opens to permit fluid flow in to the pressure chamber when the pressure inside the chamber has decreased as a result of outward movement of the piston. When the pressure in the pressure chamber is high, the inlet check valve closes, preventing fluid from exiting the pressure chamber, which in turn prevents the piston chamber from contracting, which in turn prevents the piston from retracting, achieving a so-called "no-return" function.

Many tensioners also employ a pressure relief mechanism which allows fluid to exit the pressure chamber when the pressure in the chamber is high, thus allowing the piston to retract in response to rapid increases in chain tension. In some tensioners, the pressure relief mechanism is a spring biased check valve, which opens when the pressure in the pressure chamber becomes high. Some tensioners may employ a valve which performs both the inlet check function as well as the pressure relief function. Other mechanisms employ a restricted path through which fluid may exit the fluid chamber, such that the volume of flow exiting the fluid chamber is minimal unless the pressure in the fluid chamber is great. For instance, a restricted path may be provided through the clearance between the piston and bore, through a vent tube in the protruding end of the piston, or through a vent member between the fluid chamber and the fluid reservoir.

A number of challenges exist in the design of hydraulic tensioners. One general design problem is the high cost and difficulty of manufacture and assembly. Traditionally, hydraulic tensioners have been constructed of cast iron housing bodies. The cast metal components provide the required close fit between the housing and the piston, and provide for strength and durability of the tensioner. However, this type of construction is expensive and difficult to manufacture. A need exists for a lower cost hydraulic tensioner which is easier to manufacture and assemble.

One example of a tensioner design directed to reduced cost is described in Ojima et al., U.S. Pat. No. 5,037,357. Ojima et al. disclose a spring loaded tensioner including a body having a bearing surface, a first spring seated against the bearing surface and biasing a piston in a protruding direction. A second spring functions as a damper allowing the piston to retract in response to increasing tension in the belt or chain. The body may be made of sheet metal, allowing for low cost manufacturing. The disadvantages of this design include the reliance on springs to provide the "no return" and pressure relief functions. As a result, this design does not provide the advantages in performance provided by a hydraulic tensioner.

Another tensioner known in the art employs a metal insert positioned within the bore of the housing body. The metal insert has cylindrical body and a solid bottom seated in the end of the bore. The fluid chamber is formed between the metal insert and the piston. Because the fluid chamber is formed with the metal insert, rather than the bore of the housing, the housing may be made of a less expensive material such as plastic. However, the metal insert may be difficult and expensive to manufacture and assemble. In particular, a cup-shaped insert may be difficult and expensive to manufacture. Moreover, this tensioner lacks a spring to bias the piston outward, and instead the tensioner relies on oil pressure in the fluid chamber to bias the piston outward.

Another problem in the design of tensioners is excessive retraction of the piston during engine start up. Such retraction may produce undesirable noise in the system, or may allow the chain to slip or skip a tooth. One cause of such retraction is the leakage of oil from either the fluid chamber or the oil reservoir while the engine is off. For instance, fluid may leak from the fluid chamber through a clearance between the piston and the bore. Fluid may also leak from the oil reservoir, particularly in the case of an oil reservoir positioned in a cast iron housing. Such leakage may be accompanied by the introduction of air into the fluid chamber. Because air is more compressible than fluid, the presence of air in the fluid chamber allows significantly greater piston retraction, and reduced tensioner performance.

Excessive piston retraction during engine start up may also be caused by force applied by the chain while the engine is off. For instance, if the vehicle is left on a hill, the rotational force on the wheels may cause increased chain tension in the engine. The resulting increase in chain tension may cause leak down of the piston, and poor tensioner performance during engine start-up. Thus, a need exists for a tensioner design which avoids excessive piston retraction during engine start-up.

The problems of leakage of fluid from the fluid chamber and undesired piston retraction also affect the means available for minimizing the cost to manufacture and assemble the tensioner. A poor fit between the piston and the bore of the housing allows greater leakage of fluid from the fluid chamber. Further, it is difficult and expensive to maintain the required close manufacturing tolerances of the bore and piston to avoid excessive leakage. Typically, the tensioner body is formed of cast iron or steel, with the bore machined out for the piston and check valve assembly. The disadvantages of this system include the expense of the casting system, which may require specialized manufacturing machines. In addition, the dimensional accuracy of the boring machine is limited.

Accordingly, it is an object of the present invention to provide a hydraulic tensioner which can be inexpensively manufactured and assembled. It is another object of the present invention to provide a hydraulic tensioner having improved response to fluctuations in chain tension. It is a further object of this invention to provide a hydraulic tensioner having improved performance at engine start-up. It is yet another object of this invention to provide a hydraulic tensioner which is less susceptible to leakage from its fluid chamber.

It is another object of this invention to provide a method of producing a less expensive and more effective hydraulic tensioner.

SUMMARY OF THE INVENTION

The present invention is directed to a hydraulic tensioner having a sleeve received in a bore of a housing body, such that the fluid chamber is formed between the sleeve and the piston. The housing body may be made of plastic. In addition, the housing body may be formed by injection molding, thereby allowing the sleeve to be molded into the housing body, providing for a leak-resistant fluid chamber.

According to one aspect of the present invention, there is provided a tensioner for a wrapped power transmission device, e.g. a chain linking at least two rotating members such as a pair of sprockets. The tensioner has a plastic body having a bore. A sleeve is positioned within the bore. A piston is slidably received within the sleeve, and is biased toward the chain by a piston spring. The piston and sleeve form a fluid chamber within the bore. The fluid chamber is in connection with a source of fluid, and a check valve may be provided within fluid chamber, to regulate fluid flow in to and out of the fluid chamber.

In some embodiments, the tensioner is manufactured by injection molding. In this process, generally, a plastic material is melted and then injected into the cavity of a mold. Once the melted plastic is in the mold, it cools to a shape that reflects the cavity. A variation of this process, known as insert molding, involves inserting other components into the mold prior to the injection of the melted plastic. Upon insertion, the melted plastic flows around and surrounds the inserted component. When the plastic cools and hardens, the inserted component is firmly embedded in the plastic body.

Construction of the tensioner through injection molding and insert molding provides a number of advantages over conventional methods. For instance, the bonding and interlocking of components assembled through insert molding is superior to the bonding and interlocking of components which are joined through conventional methods, such as press fitting. In addition, a seal can be formed between components which is difficult or impossible to achieve through other methods of construction. Insert molding is also easier and less expensive to accomplish than conventional methods.

In one embodiment of the present invention, the plastic housing body may be formed through injection molding. In addition, the sleeve may be insert molded into the housing body during the injection molding process. The sleeve may be positioned within the mold such that the injected melted plastic flows around the sleeve, forming a leak-resistant seal with the sleeve. In other embodiments, grooves may be provided on the exterior surface of the sleeve, to facilitate and strengthen the joining of the sleeve and the housing body. Injection molding and insert molding are manufacturing processes known generally in the art, and are described, for instance, in U.S. Pat. No. 5,215,341 and U.S. Pat. No. 4,269,387, both of which are incorporated by reference into the present application.

In other embodiments of the present invention, other components of the tensioner may also be insert molded during the injection molding process. For instance, a seal ring may be insert molded into the end of the bore, to provide a seat for the check valve. In another embodiment, a support member may be insert molded into a position against the sleeve, such that a portion of the support member is embedded in the housing body. When the melted plastic cools and hardens, the support member, by its positioning against the sleeve, helps to hold the sleeve in place with respect to the housing body. In addition, the support member supports the load applied by the check valve on the housing.

Similarly, the injection molding process may be used to form the means by which the tensioner can be installed in the engine or other application. For instance, metal inserts may be insert molded into the housing body. These inserts may be sleeves or threaded bores, through which the tensioner may be attached to the engine by bolts.

In another embodiment of the present invention, a fluid reservoir is incorporated into the housing body. By constructing the tensioner by injection molding and insert molding, a fluid reservoir may be incorporated in the housing body which is less susceptible to leakage than the fluid reservoir of a multiple-component metal tensioner. A seal may be employed to ensure that the reservoir is leak proof. In addition, incorporation of a fluid reservoir into the body of a plastic tensioner may be accomplished more easily and inexpensively as compared to incorporation of a fluid reservoir in a metal tensioner.

In another embodiment of the present invention, a clip rack is employed to prevent undesired retraction of the piston. The clip rack is attached to the sleeve or housing body and engages grooves on the outer surface of the piston. The grooves are configured to allow extension of the piston, but to resist retraction of the piston. In this way, excessive retraction of the piston, particularly during engine start-up, is prevented.

For a better understanding of these and other aspects and objects of the invention, reference should be made to the following detailed description taken in conjunction with the accompanying drawings.

BRIEF DESCRIPTION OF THE DRAWINGS

In the drawings, which are not to scale,

FIG. 4 is a perspective view of another embodiment of the present invention, a housing having a fluid reservoir;

FIG. 5 is a perspective view another embodiment of the present invention, a housing having a fluid reservoir which has a different configuration from the fluid reservoir of the housing shown in FIG. 4;

DETAILED DESCRIPTION OF THE PREFERRED EMBODIMENTS

Figure 1:
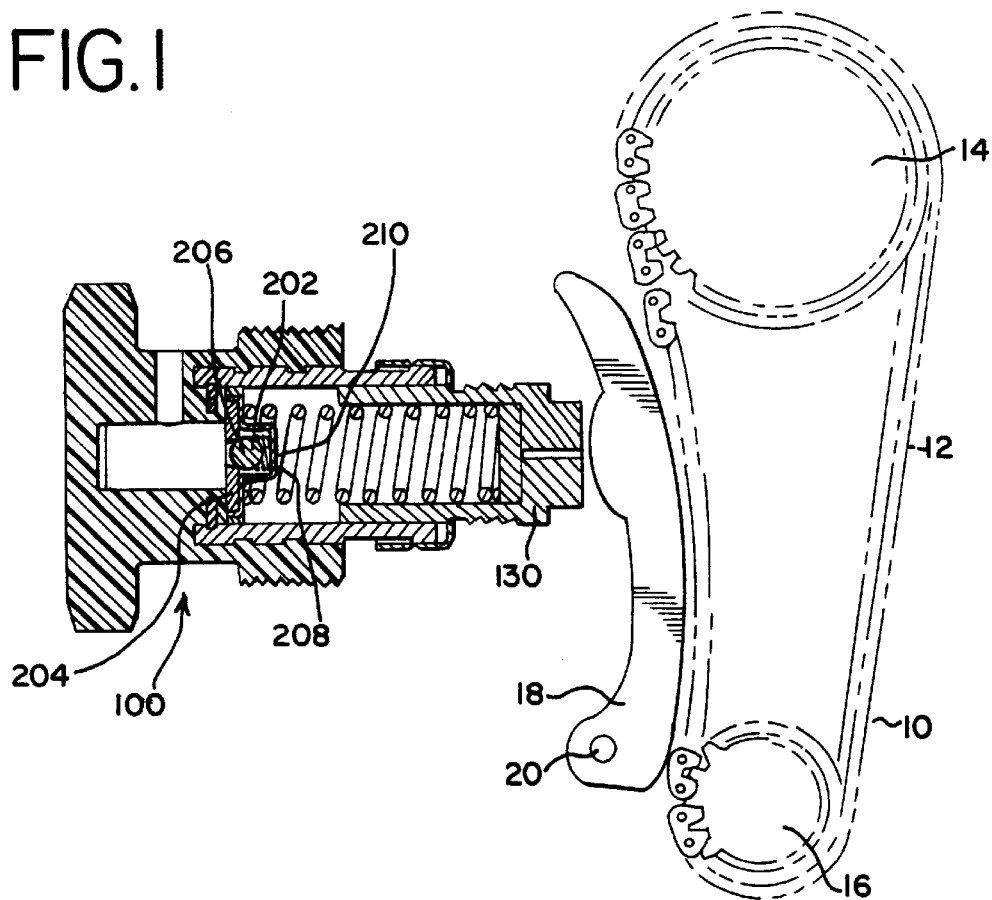
FIG. 1 is a side view of one embodiment of the present invention, a power transmission device operating with a hydraulic tensioner.

Turning now to the drawings, FIG. 1 illustrates one embodiment of the present invention. A power transmission device 10 comprises a chain 12 operating between two sprockets 14, 16. A lever arm 18 mounted on a pivot 20 presses against the chain to maintain tension. A hydraulic tensioner 100 has a piston 130, which applies force to the lever arm 18.

Figure 2:
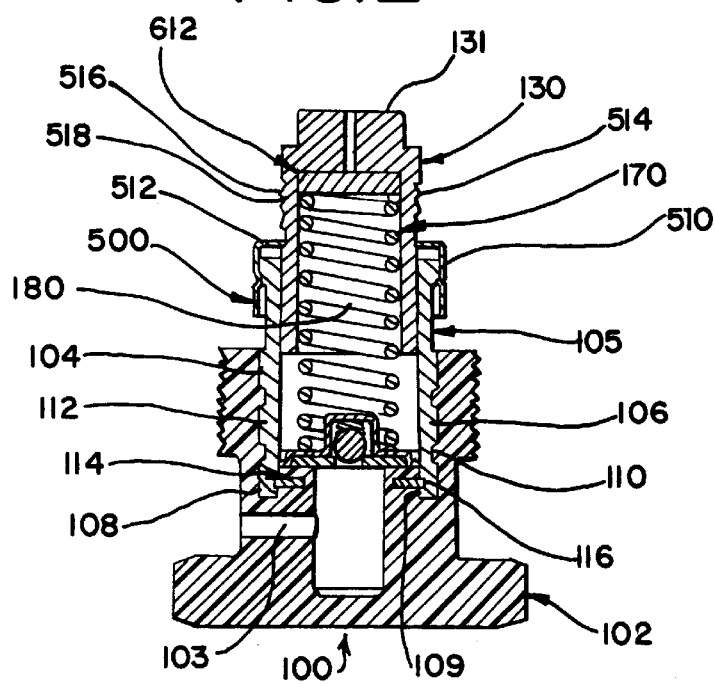
FIG. 2 is side cross sectional view of the hydraulic tensioner of the embodiment of the present invention shown in FIG. 1.

FIG. 2 shows a cross sectional view of the embodiment of the present invention shown in FIG. 1. The tensioner 100 includes a housing 102 having a bore 104 and an inner surface 106 on this bore. A sleeve 105 is received within the bore 104 of the housing body 102. Preferably, the bore and sleeve are substantially cylindrical in shape. The piston 130, which is also preferably cylindrical, is slidably received in the sleeve 105, forming a fluid chamber 180 with the sleeve 105. The piston 130 is biased out of the housing 102 by a piston spring 170, such that the piston tip 131 pushes against lever arm 18, as shown in FIG. 1. An elastic seal member, such as an O-ring (not shown), may facilitate a seal between the piston 130 and the sleeve 105.

Preferably, the sleeve 105 is metal, and is formed by turning, such as on a lathe or screw machine. This method allows for greater dimensional accuracy than conventional methods. The sleeve is also easier and less costly to manufacture as compared to a cup-shaped insert having a solid bottom. The sleeve may also be constructed through other methods known in the art such as drawing or casting.

The housing 102 may be constructed of any materials known in the art, such as steel or aluminum, but is preferably constructed of plastic, and is preferably formed through an injection molding process. An example of a suitable material for the housing 102 is polyphenylene sulfide (PPS) with glass and mineral fillers.

The sleeve 105 is securely fixed within the bore 104. In one embodiment, the sleeve has an outer surface 108 having a plurality of projections or recesses 110. These projections or recesses 110 on the sleeve outer surface 108 mesh with corresponding projections or recesses 112 on the bore inner surface 106. Alternatively, projections or recesses (not shown) may be provided on a portion of the sleeve inner circumferential surface 109 which is in contact with the housing body 102. Other means of securely fixing the sleeve 105 within the bore 104, including methods known in the art employing friction and/or mechanical interlocking, such as threads, keyways, or splines, may also be used within the scope of the present invention.

Figure 7:
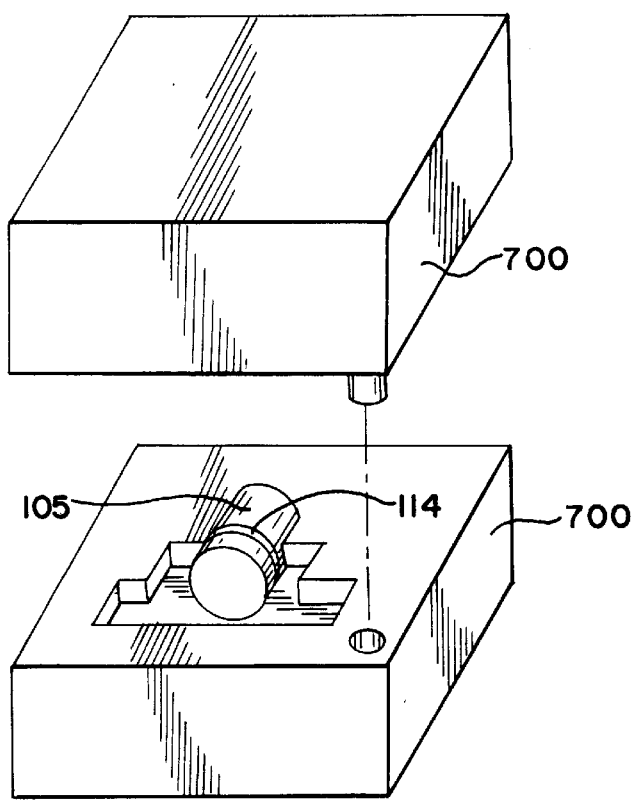
FIG. 7 is a highly schematic perspective view of another embodiment of the present invention, a method of manufacture of a hydraulic tensioner.

In another embodiment of the present invention, shown schematically in FIG. 7, the sleeve 105 is positioned in the housing 102 by insert molding. The sleeve 105 is constructed as described above. The sleeve 105 is then positioned in a mold 700 suitable for forming the desired housing. Melted plastic is then injected into the mold 700. The melted plastic then surrounds the sleeve 105 within the mold, and cools to form the housing body 102. The sleeve 105 is thereby embedded within the housing 102. The joining of the sleeve 105 and the housing 102 may include, for instance, mechanical interlocking, chemical bonding, thermal bonding and/or adhesion between the sleeve 105 and the housing 102. The sleeve 105 and housing 102 may be formed of materials well known in the art to facilitate such bonding or adhesion.

In another embodiment of the present invention, as shown in FIGS. 1 and 2, a support element 114 is provided to secure the sleeve 105 within the housing body 102. Prior to injection of the melted plastic into the mold cavity, the support element 114 is placed in the sleeve 105 such that a portion of the support element is positioned against the sleeve 105. After the melted plastic cools to form the housing body 102, the support element 114 is firmly embedded in the housing body, and the sleeve 105 is securely fixed with respect to the housing body 102 by way of its contact with the support element 114. Moreover, the support element 114 is also positioned to support the load applied by the check valve 202.

The positioning of the support element 114 may be such to prevent either outward, rotational, and/or lateral movement of the sleeve 105 with respect to the bore 104 of the housing body 102. For instance, the support element 114 may be a ring with a portion of the ring positioned within a groove 116 in the sleeve 105. In FIG. 2, the support member 114 is received on the inner circumferential surface 109 of the sleeve 105, below the fluid chamber 180. In other embodiments, the support member 114 could be received in other portions of the sleeve 105, such as on the outer circumferential surface 110 of the sleeve 105. Furthermore, the support element 114 is not limited to a ring and groove configuration. For instance, pins, keyways, or splines (not shown) could be employed to provide interlocking and/or bonding between the sleeve 105 and housing body 102 within the scope of the present invention.

In the embodiment shown in FIGS. 1 and 2, the fluid chamber 180 is connected by a channel 103 to the external source of fluid (not shown). In the preferred embodiment, valves which regulate fluid flow in to and out of the high pressure fluid chamber 180 are assembled within the fluid chamber. In one embodiment, an inlet check valve is employed. This valve allows fluid to flow from the external source of fluid into the fluid chamber 180, but does not permit fluid to flow in the reverse direction. In another embodiment (not shown), a pressure relief valve is also employed. This valve allows fluid to exit the fluid chamber, but only if the pressure in the fluid chamber increases to a certain predetermined value. In yet another embodiment, an integral inlet check and pressure relief valve is employed. This valve performs both an inlet check function as well as a pressure relief function. Check valves suitable for use with the present invention are well known in the art.

As shown in FIG. 1, a spring biased check valve 202 is preferably employed. This valve includes a valve member 206 biased by a valve spring 208 which is braced against a valve support member 210. The valve member, which is preferably a ball, is biased toward a seal member 204 which serves as a valve seat. This seal member provides a seal between the fluid chamber 180 and the source of fluid when the check valve is closed. In one embodiment of the present invention, the seal member is assembled within the tensioner by insert molding, as described above. Preferably, the seal member is formed of nylon 6/6, but the seal member may be formed of any material which is suitably pliable to form a seal between the valve member 206 and the housing 102.

As shown in FIGS. 2, 3, 4, 5, and 6, the housing 102 may include means for fastening the tensioner within its operating environment, such as the engine of an automobile. Preferably, a plurality of openings 312 are provided in the housing 102, through which the housing 102 may be attached to the engine by fastening means well known in the art, such as bolts or screws (not shown). Metal inserts 310 may be received in the openings 312 to provide a stronger and more durable construction. These metal inserts, which are preferably steel, may be held in the openings 312 by conventional means such as pins or bolts 314. Preferably, the metal inserts 310 are assembled in the housing 102 by insert molding, as described above.

Figure 3:
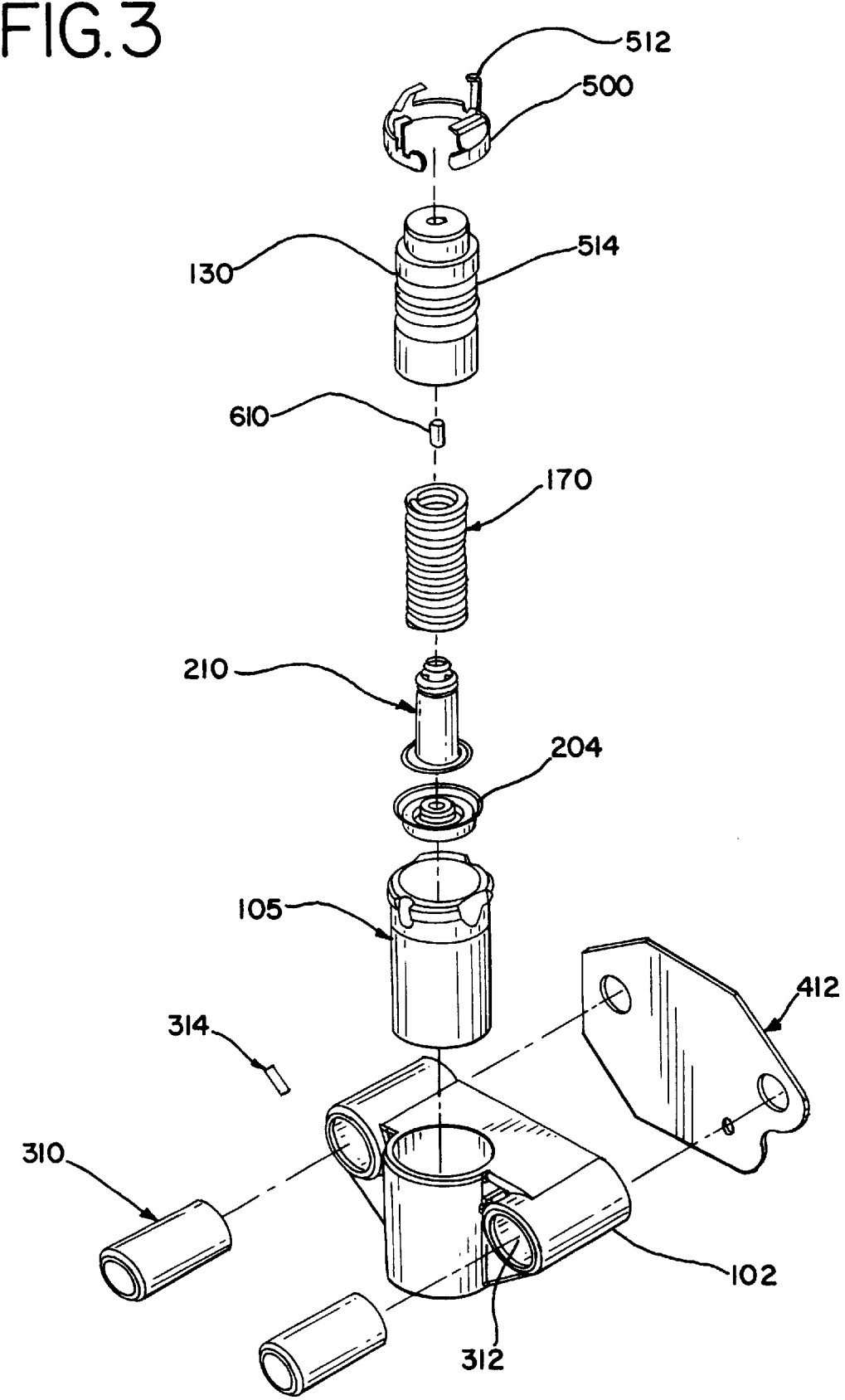
FIG. 3 is an exploded perspective view of another embodiment of the present invention.
Figure 6:
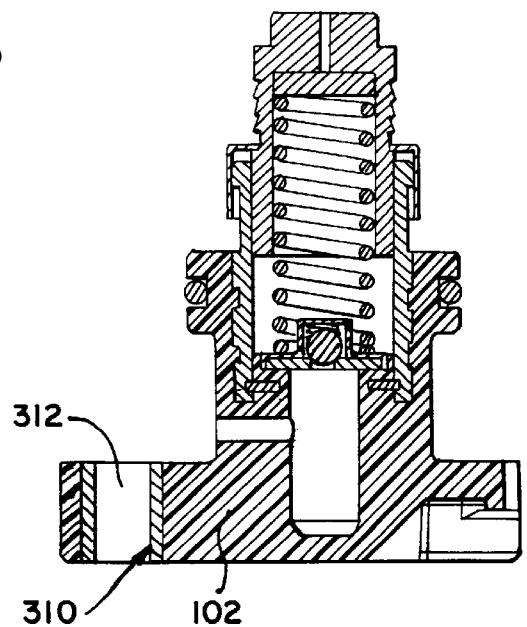
FIG. 6 is a side cross sectional view of another embodiment of the present invention.

In one embodiment of the present invention, the tensioner incorporates a fluid reservoir within the body of the tensioner. As shown in FIGS. 3, 4, and 5, the housing body 102 may include a cavity 410 in connection with the fluid chamber 180. This cavity 410 may be filled with fluid to provide a fluid reservoir for the tensioner. In the embodiments shown in FIGS. 3, 4, and 5, the cavity 410 is sealed on one side by a plate 412. The plate 412 may be fastened to the piston body by conventional means, such as bolts or screws. As shown in FIG. 4, a seal may be provided between the plate and the housing body by an elastic member, such as an O-ring 414. The O-ring 414 may be insert molded onto the housing 102, as described above, or received in a groove 416 on the housing 102.

Alternatively, as shown in FIG. 5, a seal may be provided between the plate 412 and the housing 102 by means of a deformable ridge 418, such as a crush ridge, around the periphery of the cavity 410 on the housing 102. In another embodiment, a liquid seal material may be applied between the plate and the housing body to provide a seal therebetween. Other means of providing a seal between a plate and a body having a fluid filled cavity are well known in the art and may be employed within the scope of the present invention.

As shown in FIGS. 2 and 3, one embodiment of the present invention employs a clip rack 500 to prevent the piston 130 from retracting too far when the engine is stopped. This clip rack 500 includes a clip 510 attached to the sleeve 105 or housing 102. The clip has a flange 512 which engages a plurality of grooves 514 on the outer surface of the piston. These grooves 514 are configured to easily allow extension of the piston 130, but to prevent piston retraction unless a strong retracting force is applied to the piston 130. For instance, as shown in FIG. 2, each groove may have a sloped side 516, on the side closest to the piston tip 131, and a stepped side 518 on the side furthest from the piston tip 131. During extension, the flange 512 of the clip rack slides easily along the sloped side 516 of each ridge. During retraction, the flange 512 of the clip rack engages the stepped side 518 of each groove 514, thereby impeding retraction of the piston 131.

In some embodiments of the present invention, an air vent is provided in the tip of the piston 130 to allow air to escape the fluid chamber. In one embodiment, shown in FIG. 3, a vent tube 610 is positioned in the tip of the piston 130. The vent tube 610 may be filled with a porous substance such that air may pass through the tube, but a fluid, due to its viscosity, is partially or fully prevented from passing through the tube. Thus, air may escape the fluid chamber, but fluid does not easily escape the fluid chamber. Preferably, the porous substance is powdered metal, but other substances well known in the art may also be employed within the scope of the present invention.

In another embodiment, a vent disk 612 is positioned in the end of the fluid chamber 180 closest to the piston tip 131. This vent disk 612 contains a tortuous path (not shown) having one end in connection with the fluid chamber and the other end in connection with the exterior of the tensioner. Vent disks having a tortuous path for the passage of air are well known in the art.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a plastic housing having a bore formed along a central axis of said housing, said bore having a closed end and an open end;

a generally cylindrical sleeve member having a first end and a second end, said sleeve member having a hollow cavity between said first end and said second end, said first end of said sleeve member being embedded within said bore and the second end protrudes from the bore, said sleeve member having an inner surface and an outer surface, said bore of said housing being plastic molded about at least a portion of said first end of said outer surface of said sleeve member;

a hollow piston slidably received within said sleeve member along said inner surface of said second end of said sleeve member, said piston having an inner surface and an outer surface;

a piston spring biasing said piston in a direction outward from said bore;

said sleeve member inner surface and said piston inner surface positioned and configured to form a fluid filled chamber;

said fluid filled chamber adapted to be in connection with a source of pressurized fluid; and a check valve fixedly located at said first end of said sleeve member, said check valve permitting the flow of fluid from said pressurized fluid source into said fluid filled chamber and restricting the flow of fluid in the reverse direction.

2. The hydraulic tensioner of claim 1, further comprising a sealing member positioned in the first end of said sleeve member, said sealing member positioned between said check valve and said closed end of said bore, said sealing member forming said fluid chamber with said sleeve member and said piston.

3. The hydraulic tensioner of claim 1, wherein said housing is formed of glass filled nylon 4/6 plastic.

4. The hydraulic tensioner of claim 1, wherein said housing is formed by injection molding of polyphenylene sulfide plastic with glass and mineral fillers.

5. The hydraulic tensioner of claim 4, wherein said sleeve member is positioned within said housing by insert molding, prior to injection molding of said housing about said sleeve member.

6. The hydraulic tensioner of claim 1, wherein a portion of said sleeve member outer surface is bonded to the inner surface of said bore.

7. The hydraulic tensioner of claim 4, said housing defining a fluid reservoir.

8. The hydraulic tensioner of claim 7, further comprising:
   a plate fastened to the exterior of said housing, and
   said housing having a recess on its outer surface, said recess forming said reservoir with said plate.

9. A method of manufacture of a hydraulic tensioner, said tensioner comprising a housing with a bore formed along a central axis of said housing, said bore having a closed end and an open end;
   a generally cylindrical sleeve member having a first end and a second end, said sleeve member having a hollow cavity between said first end and said second end, said first end of said sleeve member being embedded in said bore and the second end protrudes from the bore, said sleeve member having an inner surface and an outer surface;
   a hollow piston slidably received within said sleeve member along said inner surface of said second end of said sleeve member to define a fluid chamber connected with a source of pressurized fluid,
   a check valve fixedly located at said first end of said sleeve member, said check valve permitting the flow of fluid from said pressurized fluid source into said fluid filled chamber and restricting the flow of fluid in the reverse direction, and
   a piston spring biasing said piston in a protruding direction outward from said bore, said method comprising the steps of:
      placing the sleeve member in a mold configured to form the desired housing,
      forming the housing by injection molding, said bore of said housing being molded about at least a portion of said first end of said outer surface of said sleeve member, and
      assembling the piston and piston spring within the sleeve member.

10. The method of claim 9, wherein said hydraulic tensioner further comprises a sealing member positioned in the first end of said sleeve member, said sealing member positioned between said check valve and said closed end of said bore, said method further comprising the steps of:
   placing the sleeve member in a mold configured to form the desired housing,
   placing the sealing member in said mold such that said sealing member will be positioned in the closed end of said bore,
   forming the housing by injection molding, and
   assembling the piston and piston spring within the sleeve member.

* * * * *